Jan. 10, 1928.
J. A. GARCIA
VARIABLE CONDENSER
Filed Jan. 5, 1926
1,655,784
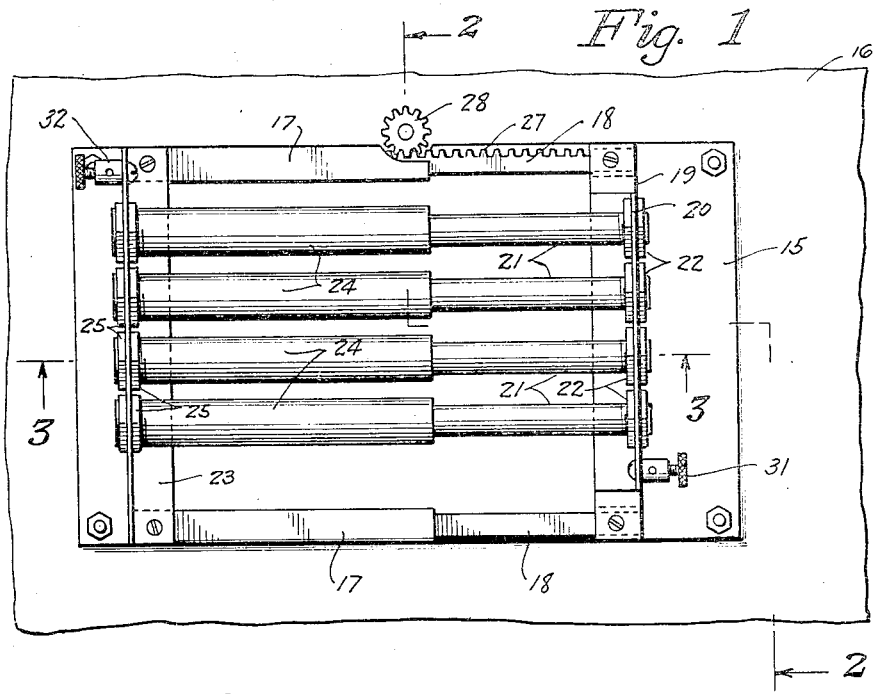
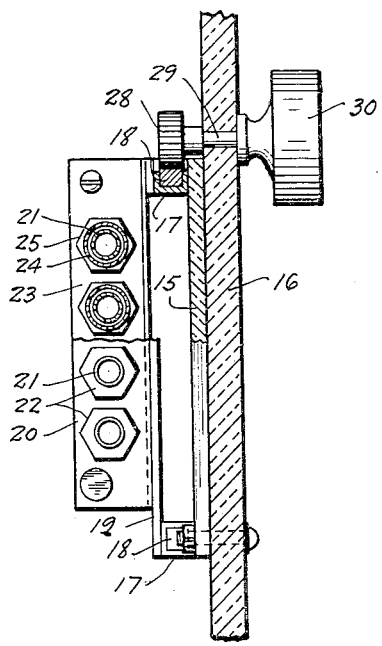
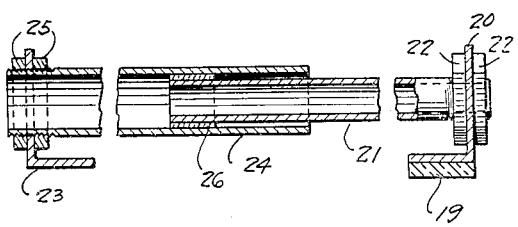
INVENTOR.
José Ancira Garcia
BY
ATTORNEYS.

Patented Jan. 10, 1928.

1,655,784

UNITED STATES PATENT OFFICE.

JOSÉ ANCIRA GARCIA, OF SAWTELLE, CALIFORNIA.

VARIABLE CONDENSER.

Application filed January 5, 1926. Serial No. 79,373.

My invention relates to variable condensers as used in radio receiving and transmitting apparatus, as well as in telephone and telegraph apparatus.

In variable condensers as heretofore proposed, they are constructed of a set of stationary plates constituting a stator, and a set of movable plates constituting a rotor which are movable into and out of the stator plates to vary the capacity of the condenser. I have found that such plate condensers when used in radio receiving sets produce objectionable noises and other troubles which seriously interfere with perfect reception.

It is a purpose of my invention to provide a variable condenser which by the use of tubular stator and movable elements completely eliminates the use of plates and the attendant disadvantages, thus greatly furthering perfect reception in radio apparatus.

I will describe only one form of variable condenser embodying my invention and will then point out the novel features thereof in claims.

In the accompanying drawings,

Figure 1 is a view showing in front elevation one form of variable condenser embodying my invention;

Figures 2 and 3 are sectional views taken on the lines 2—2 and 3—3, respectively, of Figure 1.

Referring specifically to the drawing, in which similar reference characters refer to similar parts, my invention, in its present embodiment, comprises a plate 15 of suitable insulating material bolted or otherwise secured to the inner side of a panel 16 constituting part of a suitable cabinet. Secured to the longitudinal edges of the plate 15 are a pair of guiding sleeves 17 which are of angular shape in cross section to slidably receive correspondingly shaped rods 18. One end of the rods 18 is connected by a bar 19 of insulating material, and secured to the outer side of this bar is an angle bar 20 formed of conducting material and provided at intervals with openings through which are extended the threaded ends of conducting elements 21 constituting the rotor of the condenser. These threaded ends are engaged by nuts 22 at opposite sides of the bar 20 and so as to firmly embrace the bar and thereby secure the elements 21 to the bar.

A second angle bar 23 of conducting material is secured to one end of the sleeve 17, and this bar is likewise provided at intervals with openings to receive the threaded ends of conducting elements 24 constituting the stator of the condenser. Nuts 25 engage the threaded ends of the elements at opposite sides of the angle bar 23 so as to firmly secure the elements to the bar in the same manner as described in connection with the elements 21.

The elements 21 and 24 are of tubular form, as clearly shown in Figure 3, and of such diameter that the elements 21 are telescopically received within the elements 24. Spacing sleeves 26 (Figure 3) formed of insulating material are secured to the inner ends of the elements 21 and these sleeves are adapted to have sliding engagement with the elements 24 to support the elements 21 in spaced relation to the elements 24, irrespective of the longitudinal adjustment of the former within the latter.

The rods 18, being slidable in the sleeve 17, operate to support the movable elements 21 for movement longitudinally into and out of the stator elements 24, and with the movable elements maintained in spaced relation to the stator elements through the medium of the insulating sleeves 26, it will be manifest that the intervening space provides the dielectric which is capable of being increased or decreased in accordance with the longitudinal adjustment of the movable elements with respect to the stator elements. Any longitudinal adjustment of the movable elements can be effected by forming one of the rods 18 with teeth 27 to provide a rack bar engaged by a pinion 28 fixed to a stub shaft 29 journaled in the panel 16 and provided with an operating handle 30. By rotation of the handle 30, the pinion is actuated to move the rack bar longitudinally and with it the several movable elements, so as to vary their longitudinal adjustment with respect to the stator elements.

Binding posts 31 and 32 are carried by the angle bars 20 and 23, and it will be understood that conductors (not shown) are connected with these binding posts for supplying the current to the movable and stator elements.

Although I have herein shown and described only one form of variable condenser embodying my invention, it is to be understood that various changes and modifications may be made therein without departing from the spirit of the invention and the spirit and scope of the appended claims.

I claim as my invention:

1. A variable condenser comprising a support, guiding sleeves secured to the support, tubular movable elements, a frame for supporting the movable elements in fixed position relatively and including rods slidable in said sleeves, stator elements of tubular form secured on the support and telescopically receiving the movable elements, and means by which said frame is moved to vary the longitudinal position of the movable elements with respect to the stator elements.

2. A variable condenser comprising a support, guiding sleeves secured to the support and of angular form in cross section, rods of angular form in cross section and slidably received in said sleeves, an insulating bar connecting the sleeves, an angle bar secured to the insulating bar and provided with openings, tubular movable elements secured within the openings of said bar, a second angle bar secured to the sleeves and provided with openings, tubular stator elements extending into and secured within said openings to concentrically receive the movable elements, spacing sleeves secured to the rotor elements to maintain the same in definite spaced relation to the stator elements, a rack formed on one of said rods, and a pinion engaging the rack for the purpose described.

3. A variable condenser comprising a support, guiding sleeves secured to the support, rods slidably received in said sleeves, a bar connecting the rods and insulated therefrom, movable elements secured to said bar in spaced parallel relation, a second bar secured to the sleeves, tubular stator elements secured to the second bar in parallel relation to and freely receiving the movable elements, means slidably received in the stator elements for maintaining the elements in definite spaced relation, and means for actuating the movable elements to vary the telescopic relation thereof with respect to the stator elements.

JOSÉ ANCIRA GARCIA.